United States Patent

[11] 3,568,802

| [72] | Inventor | James E. Marshall |
| | | Westminster, Calif. |
| [21] | Appl. No. | 857,083 |
| [22] | Filed | Sept. 11, 1969 |
| [45] | Patented | Mar. 9, 1971 |
| [73] | Assignee | Mattel, Inc. |
| | | Hawthorne, Calif. |

[54] SPRING MOTOR WITH INTEGRAL SPRING CLUTCH
10 Claims, 3 Drawing Figs.

[52] U.S. Cl.................................................... 185/39,
185/45
[51] Int. Cl.................................................... F03g 1/00
[50] Field of Search........................................ 185/39, 45,
37, 40 (M), D1 (SPR Powered Toys)

[56] References Cited
UNITED STATES PATENTS

| 3,017,187 | 2/1960 | Ryan.......................... | 274/14 |
| 504,808 | 9/1893 | Howard........................ | 185/39 |
| 524,792 | 8/1894 | Seiberling..................... | 185/45 |
| 3,049,317 | 8/1962 | Kessler........................ | 185/37 |

*Primary Examiner*—Edgar W. Geoghegan
*Attorney*—Seymour A. Scholnick

ABSTRACT: A spring motor for toys and other mechanisms whose speed is regulated by a governor and that includes a constant-torque spring which can be wound onto a power drum or unwound therefrom onto a takeup spool, wherein a ratchet is employed to uncouple the governor from the spring during winding of the spring thereon, to reduce the power required to wind the spring. A ratchet wheel coupled to the governor lies within the power drum, and the end portion of the spring that is fixed to the drum has an outer part that extends to the ratchet wheel to serve as a pawl that drives it only as the spring unwinds.

PATENTED MAR 9 1971 3,568,802

INVENTOR
JAMES E. MARSHALL
BY Max E. Shirk
ATTORNEY

SPRING MOTOR WITH INTEGRAL SPRING CLUTCH

BACKGROUND OF THE INVENTION

1. Field of the Invention

This invention relates to spring motors.

2. Description of the Prior Art

One type of spring motor commonly used in talking dolls includes a record mounted on a power drum, a spring for turning the drum in a forward direction to play the record, and a pull cord for turning the drum in the reverse direction to wind up the spring. The spring is typically a constant torque type which winds onto the power drum as the cord is pulled and unwinds therefrom onto a takeup spool when the cord is released. A governor is required to regulate the speed of the power drum as it is rotated in the forward direction by the spring. However, the governor provides an extra load as the cord is pulled to wind the spring, making the toys more difficult to operate by small children. In addition, the governor may be rotated faster during winding than during unwinding, so that the parts are overstressed as the cord is pulled and a sturdier but less sensitive governor must be used.

OBJECTS AND SUMMARY OF THE INVENTION

An object of the present invention is to provide a spring motor which requires a minimum of power to wind.

Another object of the invention is to provide an easily operated spring motor which is of minimum complexity and cost.

In accordance with the present invention, a spring motor is provided which is of simple construction, yet which requires a minimum of power to wind. The motor includes a power drum which is turned in a reverse direction by a pull cord or other manual winding apparatus to wind a spring on the drum. The drum is then turned in a forward direction by the spring, as it unwinds from the drum onto a takeup spool or the like, to play a record or other device coupled to the drum. A power takeoff, such as a governor, has a ratchet wheel mounted adjacent to the power drum. An end portion of the spring which is mounted on the drum has an outer part that extends to the ratchet wheel. This part of the spring serves as a pawl that drives the ratchet wheel and the governor coupled to it only when the drum is rotating in the forward direction to play the record. Thus, the governor does not impose an extra load during winding of the spring, but rotates only as the spring unwinds.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
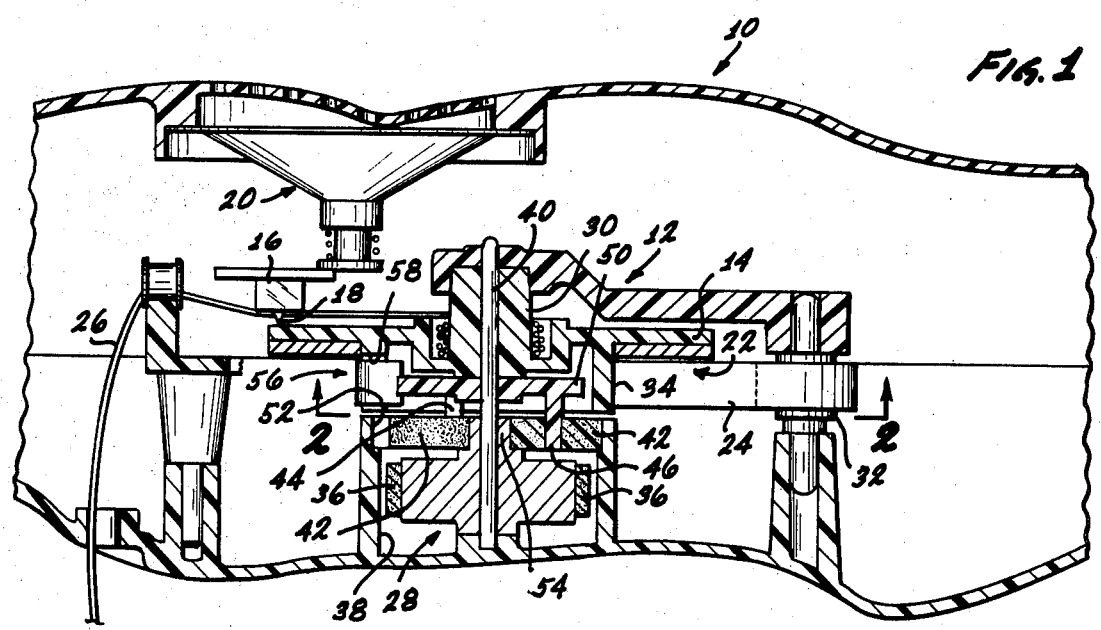
FIG. 1 is a partial side sectional view of a talking doll which includes a spring motor constructed in accordance with the invention.
Figure 2:
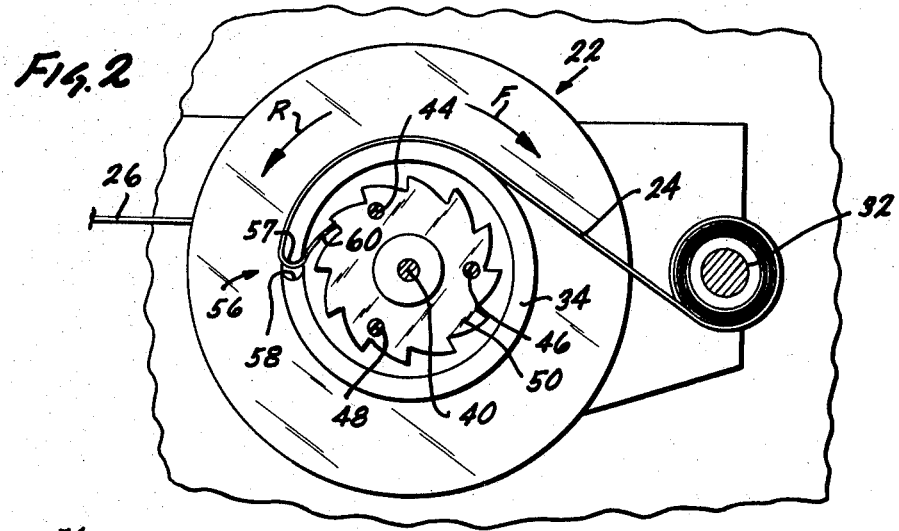
FIG. 2 is a view taken on the line 2-2 of FIG. 1.
Figure 3:
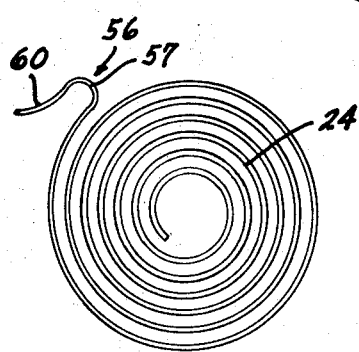
FIG. 3 is a side elevational view of the spring portion of the spring motor of FIG. 1 in its naturally coiled condition.

The figures illustrate a doll 10 with a phonograph mechanism 12 constructed in accordance with the invention. The phonograph includes a record 14 with a spiral groove that defines a sound recording, a tone arm 16 with a needle 18 for playing the record, and a speaker assembly 20 for acoustically amplifying the sounds picked up by the needle. The record is formed in a turntable or power drum 22 that is rotated by a spring 24 during playing of the record, and which is rotated in the opposite direction when a child pulls on a draw cord 26 to wind up the string. A governor 28 is coupled to the power drum to regulate its speed during unwinding of the spring, when the record is played.

The phonograph is activated when a child pulls on the cord 26. This causes an inner portion of the cord to be unwound from a cord receiving portion 30 of the power drum assembly, causing the drum assembly to turn in a reverse direction, as indicated by arrow R. As the drum is rotated by the cord, the constant-torque spring 24 is unwound from spring holding means formed by a takeup drum or spool 32 and onto a spring-receiving portion 34 of the power drum. In the position where the cord has been fully pulled, most of the spring 24 is on the spring receiving portion 34. When the cord is released, the spring 24 moves back onto the spool 32, thereby causing rotation of the power drum assembly in a forward direction indicated by arrow F. During forward rotation, the record 14 on the drum assembly turns and the needle 18 plays the recording defined therein.

During the playing of the record, the speed of the power drum assembly is regulated by the governor 28. The governor includes a pair of weights 36 that fly out by centrifugal force, against the urging of inwardly biasing springs, when the speed of the governor exceeds a predetermined level. The outer surfaces of the weights then bear against a governor raceway 38 to slow down the governor. Both the governor 28 and the power drum 22 rotate freely on the shaft 40 that is mounted on the doll housing. The governor 28 is driven by a set of three planetary discs 42 mounted to shafts 44, 46 and 48 that extend from a ratchet wheel 50 that is also rotatably mounted on the shaft 40. The planetary discs bear against a planetary raceway 52 and a hub 54 on the governor. When the power drum rotates in the forward direction, it drives the ratchet wheel 50 in the forward direction, and the ratchet wheel drives the planetary members to rotate the governor at a high speed.

The ratchet wheel 50 is provided to enable the power drum to turn in the reverse direction of arrow R without rotating the governor 28. This allows a child to pull the cord 26 rapidly in winding the spring, without requiring him to overcome the restraint which would be applied by a governor. The coupling of the power drum 22 to the ratchet wheel 50 is made through an end portion 56 of the spring. The spring receiving portion 34 of the drum assembly has an opening or slot 58 therein, and the end portion 56 of the spring is bent into an acute angle and passed through the slot, so that the bend lies against a wall of the slot. The spring is always under some tension so the inner part 57 of the end portion is held, or mounted, on the power drum. The outer end portion 60 of the spring bears against the ratchet wheel, and serves as a pawl to couple the power drum to the ratchet wheel. When the power drum is rotated in the reverse direction of arrow R, the outer end part 60 of the spring deflects and rides over or slips on the teeth of the ratchet wheel, thereby uncoupling the governor from the power drum assembly. On the other hand, when the power drum assembly rotates in the forward direction of arrow F, the end portion 60 of the spring positively engages the ratchet wheel, and drives it also in the forward direction. The ratchet wheel then transmits power through the planetary members to the governor, to rotate the governor at a high speed.

By utilizing the end portion 56 of the constant-torque spring 24 as a pawl, the toy is made more economical. This is because it eliminates the need for a separate pawl, a pin for pivotally mounting the pawl onto the power drum assembly, and a separate spring for biasing the pawl toward the ratchet wheel. The location of the ratchet wheel 50 within the spring receiving portion 34 of the power drum also enables a very compact construction, particularly in the case of a planetary governor drive.

Thus the invention provides an easily operated spring motor which is economical and compact. The illustrated motor is of the type wherein the power drum is rotated in a reverse direction during the winding of a spring and rotates in the opposite direction during unwinding of the spring. Coupling of the spring-receiving portion 34 to the cord-receiving portion 30 is necessary during both directions of rotation of the power drum, since the cord must be made to rewind after it is pulled. Coupling to the governor or other takeoff means is necessary only during the forward rotation of the power drum by the spring. It is not necessary to uncouple the power drum from the record during reverse rotation, since the record does not require much power to rotate. However, if other takeoff means are to be driven which do require substantial power, then they may be coupled to the ratchet wheel instead of directly to the power drum, so that they are rotated only during forward driving of the power drum by the spring.

Although particular embodiments of the invention have been described and illustrated herein, it is recognized that modifications and variations may readily occur to those skilled in the art and, consequently, it is intended that the claims be interpreted to cover such modifications and equivalents.

I claim:

1. Motor apparatus comprising:
   drum means mounted for rotation in first and second directions;
   a spring having an end portion coupled to said drum means for imparting rotation thereto during unwinding of said spring from said drum means;
   power takeoff means including a ratchet wheel mounted inside said drum means; and
   means formed integrally with said end portion of said spring and extending into operative engagement with said ratchet wheel for coupling said drum means to said takeoff means substantially only during rotation of said drum means in the direction it is normally driven by said spring.

2. The motor apparatus described in claim 1 wherein:
   said drum means comprises a substantially ring-shaped member with an outer surface for supporting said spring when it is wound thereon, and an opening for permitting the passage of at least part of said end portion of said spring to said ratchet wheel; and
   said end portion of said spring is bent at an acute angle, with the bend passing around a wall of said opening in said drum means.

3. The motor apparatus described in claim 1 wherein:
   said drum means has a pull cord receiving portion; and
   including a pull cord having an inner end attached to said drum means and a portion extending around said cord receiving portion when said spring is unwound.

4. The motor apparatus described in claim 1 wherein; said power takeoff means comprises a governor coupled to said ratchet wheel.

5. Motor apparatus comprising:
   power drum means for rotation in first and second directions;
   spring takeup drum means;
   a spring extending between said power and takeup drum means for unwinding from one drum means onto the other;
   means for turning said power drum means in said first direction to wind said spring around it;
   power takeoff means; and
   ratchet means for coupling said power drum means to said takeoff means substantially only during rotation of said power drum means in said second direction.

6. The motor described in claim 5 wherein; said ratchet means comprises a ratchet wheel coupled to said power takeoff means, and pawl means for coupling said power drum means to said ratchet wheel, said pawl means comprising an end portion of said spring.

7. The motor apparatus described in claim 5 wherein:
   said ratchet means comprises a ratchet wheel positioned within said power drum means;
   said power drum means has an opening for coupling the region where said spring is wound thereabout and the position of said ratchet wheel; and
   said spring has an end which is folded at an acute angle, and which extends through said opening and against said ratchet wheel.

8. The motor apparatus described in claim 4 wherein:
   said governor is coupled to said ratchet wheel by a plurality of planetary members rotatably mounted on said ratchet wheel and a raceway disposed about said planetary members; and
   said governor is mounted coaxial with said ratchet wheel and has a hub portion engaged with said planetary members.

9. In motor apparatus with a power drum that drives a governor or other power takeoff, wherein a spring extends between a spring holding spool and the power drum to wind onto the power drum when it is driven in a first direction and to unwind therefrom to drive it in a second direction, the improvement comprising:
   a ratchet wheel connected to said power takeoff for transmitting power thereto from said power drum when said power drum turns in said second direction; and
   wherein said spring has an end portion with an inner part mounted on said power drum and an outer part disposed against said ratchet wheel to positively engage it when said power drum turns in said second direction and to slip on it when said power drum turns in said first direction.

10. The improvement described in claim 9 wherein:
    said ratchet wheel is disposed coaxial with said power drum and within it; and
    said power drum has a slot therein, and said end portion of said spring extends through said slot and against said ratchet wheel.